Dec. 7, 1965    W. T. R. KINRAIDE    3,222,080
LOAD CARRYING AND RESCUE SLED
Filed Oct. 10, 1963    5 Sheets-Sheet 1
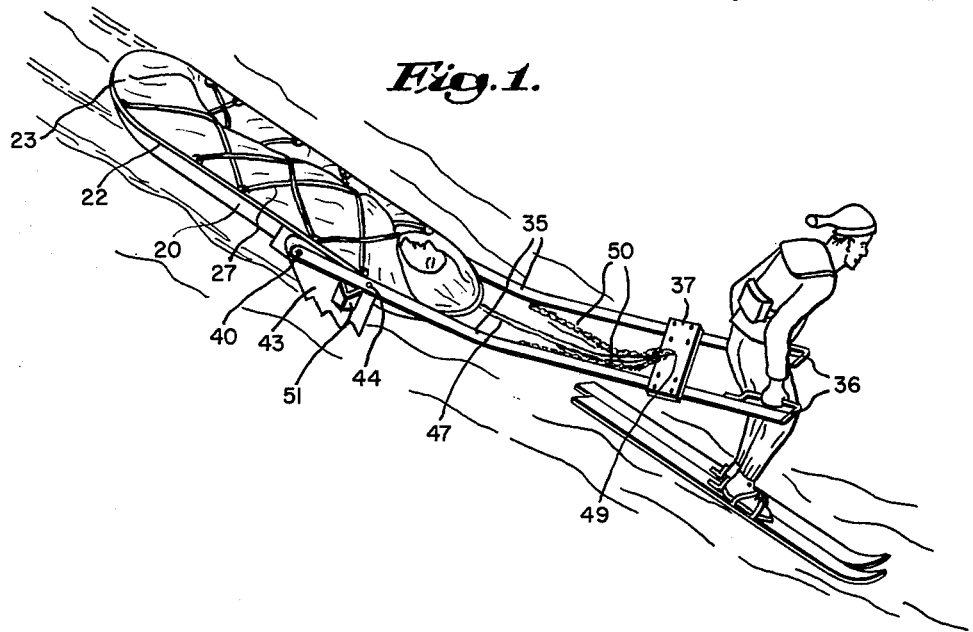
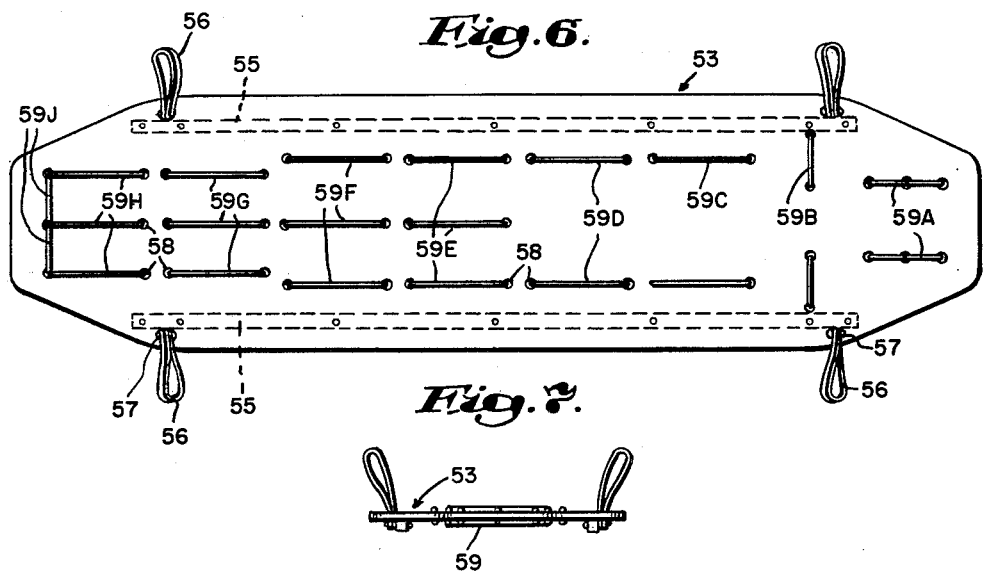
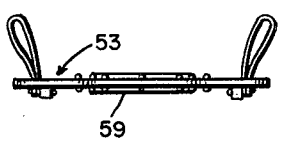
Inventor:
William T. R. Kinraide
by Abbot Spear,
Attorney

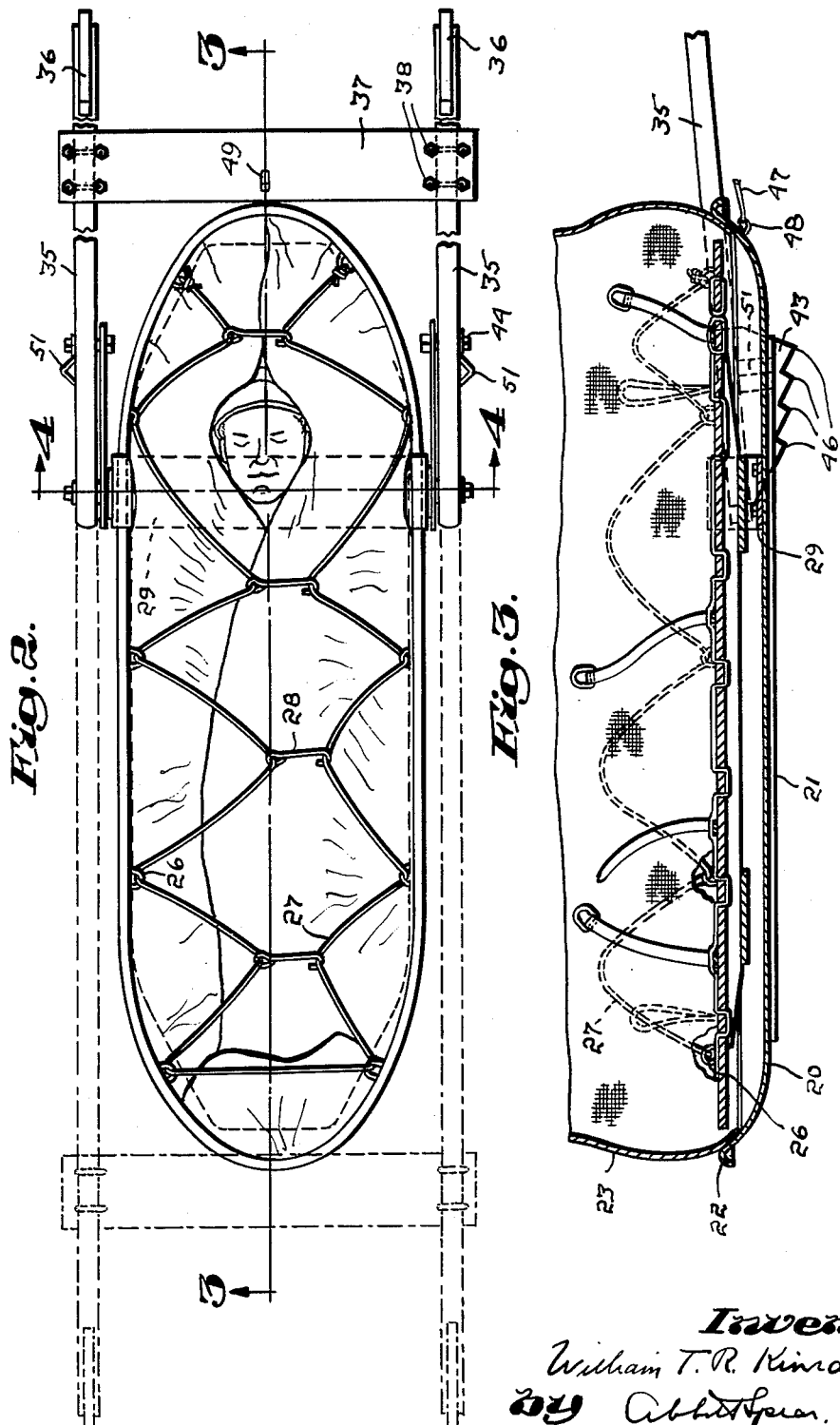

Dec. 7, 1965  W. T. R. KINRAIDE  3,222,080
LOAD CARRYING AND RESCUE SLED
Filed Oct. 10, 1963  5 Sheets-Sheet 3
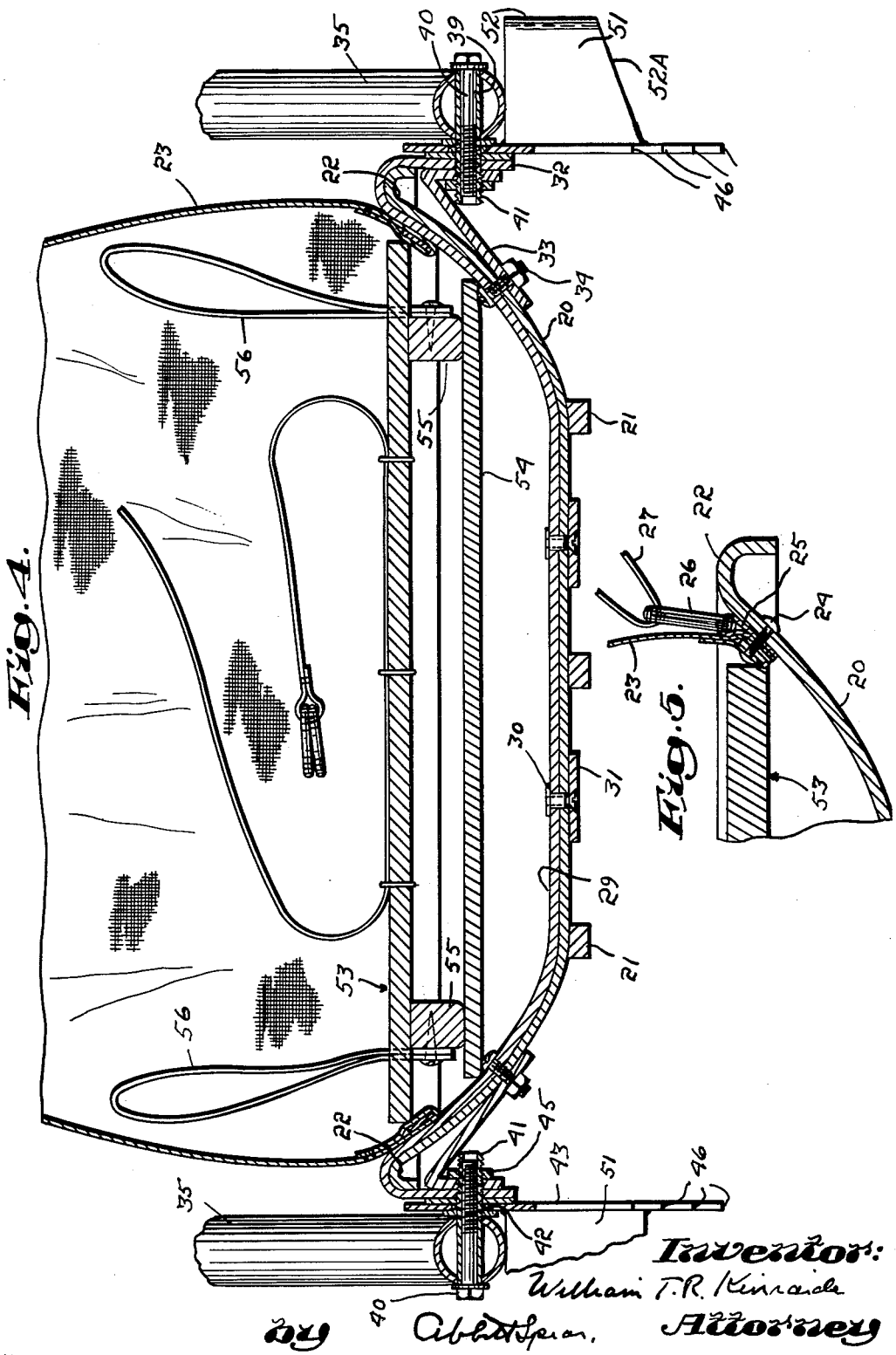
Inventor:
William T. R. Kinraide
by Abbott Spear, Attorney

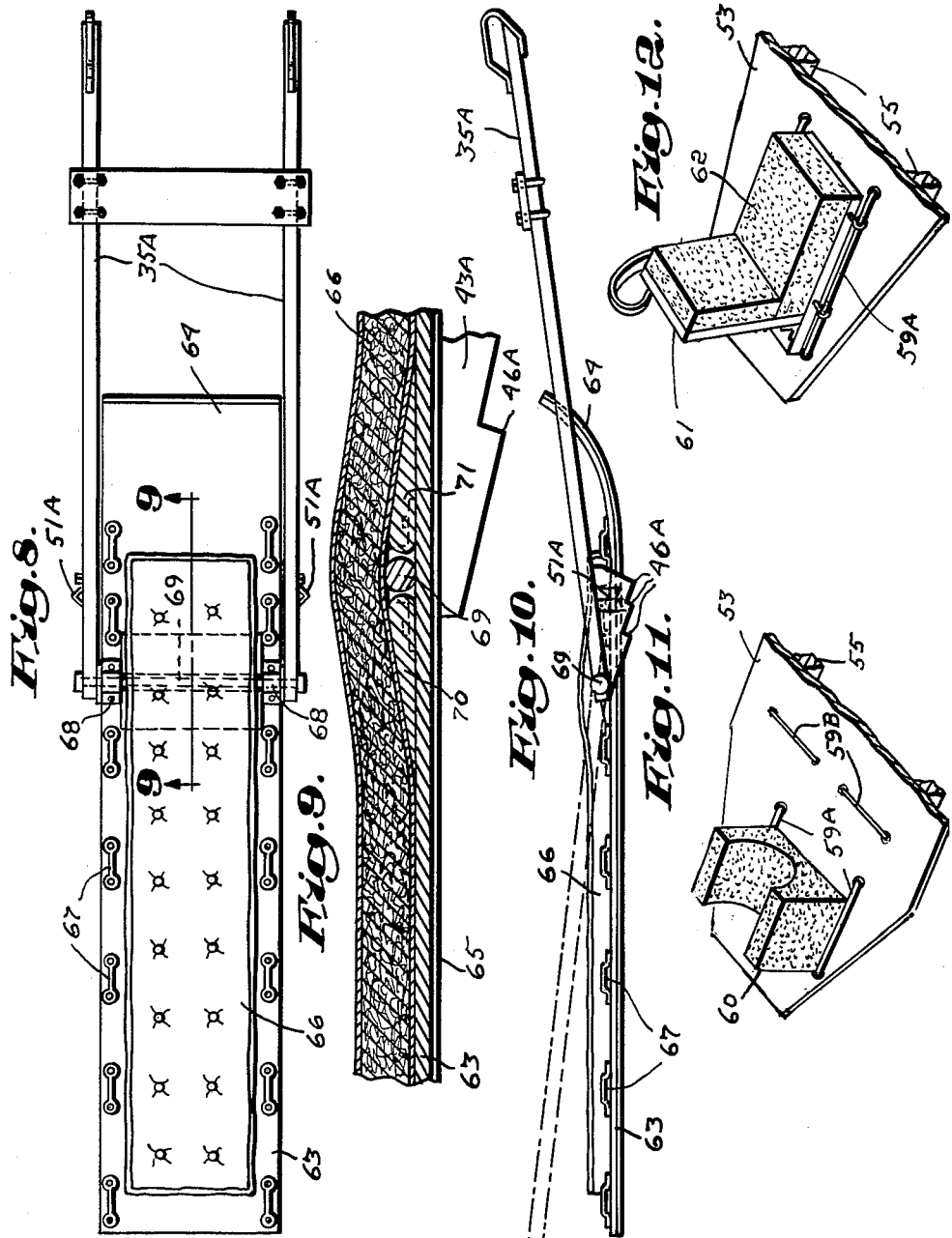

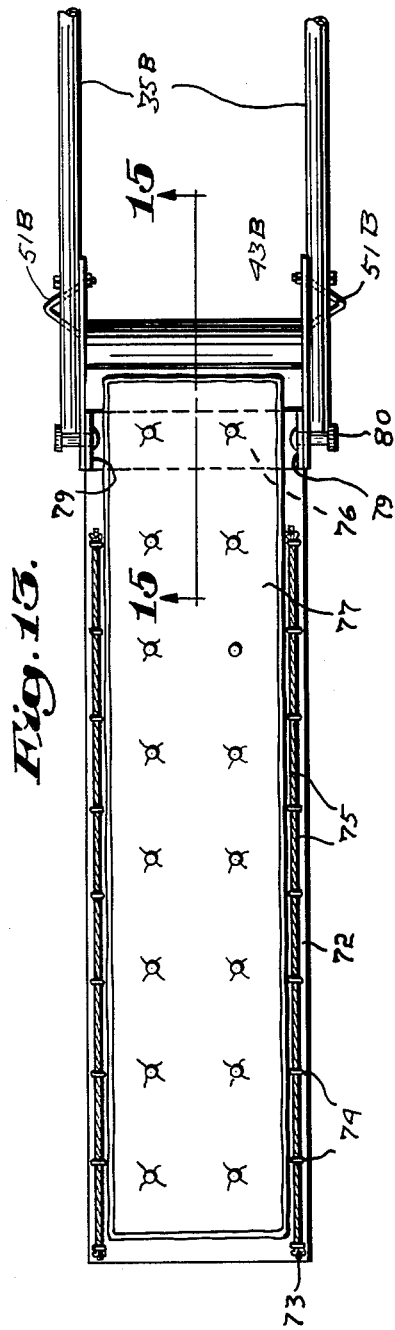
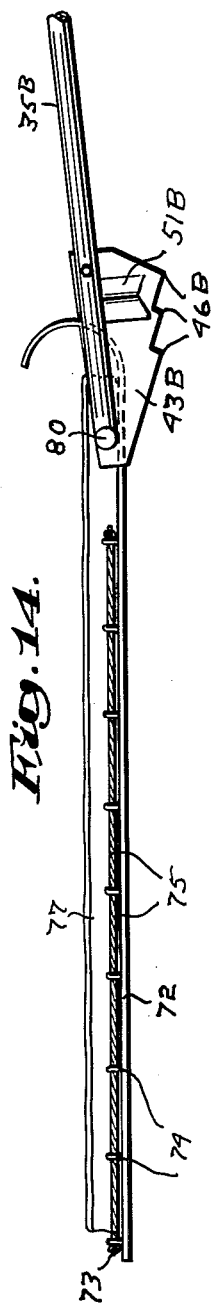
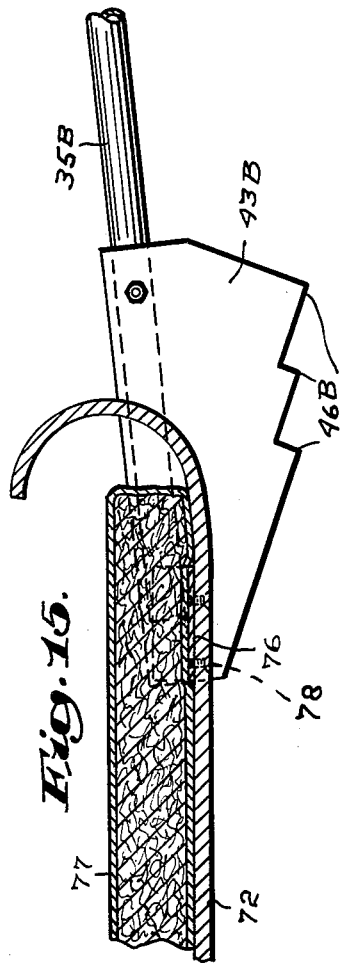

United States Patent Office 3,222,080
Patented Dec. 7, 1965

3,222,080
LOAD CARRYING AND RESCUE SLED
William T. R. Kinraide, 113 Virginia Road,
Waltham, Mass.
Filed Oct. 10, 1963, Ser. No. 315,170
16 Claims. (Cl. 280—18)

The present invention relates to sleds for use in carrying injured skiers and other loads.

While sleds in accordance with the invention are well adapted to carry a wide variety of loads, particular reference is made herein to their use in the rescue of injured skiers as best illustrating both the problems involved and the novel features and advantages afforded by the present invention.

It will be appreciated that the necessity of bringing an injured skier down from a mountain over icy and snow covered terrain that often would tax the skill of an expert skier presents a wide range of problems. While it is apparent that the victim must be taken to the hospital as quickly as possible and be protected from further injury in transit, actual conditions dictate that the victim must be secured on a sled and brought to safety, usually but not necessarily, by a single skier. The difficulties involved in so doing are many but, in general, they involve problems of ensuring that the skier, effecting the rescue, is able to control the sled quickly and positively on ice and snow on any terrain and that the sled is so constructed that, even if control of it is lost so that the sled becomes free, as it might if the rescuing skier fell or if the sled was left unattended on an incline, it is automatically subjected to an effective braking action.

In accordance with the invention, a sled meeting the above generally stated requirements, has an elongated body slidable on the ice and snow to which a pair of handles are pivotally connected. Each arm includes a laterally disposed brake for braking engagement with the ice and snow by vertically swinging the handles in a vertical direction to an appropriate extent.

The positive control of a sled against sideward movements is essential and another objective of the present invention is to provide keels for that purpose, the keels being secured to the arms and preferably with the brakes attached thereto.

A further objective of the invention is to have the handles of sufficient weight so that if they are dropped, they will maintain the brakes and keels, if both are attached thereto, in operative engagement with the ice and snow.

As the problem of safely transporting the injured skier to the hospital remains when the sled can no longer be used, another objective of the invention is to provide a stretcher that can be used as a removable insert for a rescue sled and to which the injured person may be secured, even though his injuries require immobilization, and safely carried, even in an inverted position, directly to the X-ray or operating rooms.

In the accompanying drawings, there are shown illustrative embodiments of the invention from which these and other of its objectives, novel features, and advantages will be readily apparent.

In the drawings:

FIGURE 1 is a perspective view of a sled in accordance with one embodiment of the invention, the view illustrating its use in rescuing injured skiers, FIGURE 2 is a top, elevational view, on a substantially increased scale, of the rescue sled, FIGURE 3 is a section taken approximately along the indicated line 3—3 of FIGURE 2, FIGURE 4 is a section, on a further increase of scale, taken approximately along the indicated lines 4—4 of FIGURE 2, FIGURE 5 is a fragmentary section taken through the rim of the sled body rearwardly of the section line 4—4, FIGURE 6 is a top, elevational view of the stretcher removed from the sled, FIGURE 7 is an end view thereof, FIGURE 8 is a top, elevational view of a sled in accordance with another embodiment of the invention, FIGURE 9 is a section, on an increased scale, taken approximately along the indicated lines 9—9 of FIGURE 8, FIGURE 10 is a side view of the sled shown in FIGURE 8, FIGURE 11 is a fragmentary perspective view of the forward end of a stretcher illustrating one type of head support, FIGURE 12 is a like view of another type of head support, FIGURE 13 is a top elevational view of yet another embodiment of a sled in accordance with the invention, FIGURE 14 is a side view thereof, and FIGURE 15 is a fragmentary section, on an increased scale, taken approximately along the indicated lines 15—15 of FIGURE 13.

The sled, illustrated by FIGURES 1–5, has an elongated, disk-shaped body 20 provided with runners 21 and with an outwardly and downwardly rolled rim 22. A fabric cover 23, of such a width that its inner margins will overlap, has its outer margins attached to the body 20 adjacent the rim 22 as by rivets 24 (see FIGURE 5) which also serve to anchor the straps 25 carrying eyes 26. A length of rope 27, the ends of which are tied to appropriate ones of the eyes 26, is threaded through the other eyes 26 and is provided with hooks 28 to connect the rope 27 along one side of the sled body 20 to the rope 27 along the other side thereof after the cover 22 has been folded over an injured person as illustrated by FIGURES 1 and 2.

In accordance with the invention, the sled body 20 has a transverse saddle 29 connected as at 30 through the bottom of the sled body 20 to saddle pads 31, see FIGURE 4. The saddle 29 has downturned ends 32 each of which extends below the rim 22 and is there backed by a brace 33. Each brace 33 is bolted as at 34 to the saddle 29 through the appropriate side of the sled body 20.

Two handles 35 are provided, one for each side of the sled body 20, and having a hand grip 36. The handles 35 are shown as tubular and interconnected by a cross brace 37 rigidly secured thereto by U-shaped clamps 38. The other end of each handle 35 is shown as transversely bored to receive a pivot sleeve 39 through which there extends a pivot bolt 40. Each pivot bolt 40 is threaded into a sleeve 41 having a flange 42 serving as a bearing for the rotatable support of a plate 43 which is also bolted as at 44 to the proximate handle 35. Each sleeve 41 extends through a saddle end 32 and its brace 33 and is externally threaded to receive the anchoring nut 45. While the thus established pivot axis of the handles 35 is adjacent the forward end of the sled body 20, the handles 35 are of sufficient length so that they may be swung rearwardly from the forward towing position into a rearward, pushing position, shown in dotted lines in FIGURE 2, in which position the handle grips 36 are rearwardly of the sled body 20.

Each plate 43 functions as a keel and has its bottom edge serrated to provide teeth 46 for engagement with the snow or ice with the extent of such engagement being determined by the angular relation of the handles 35 to the surface over which the sled is being towed. It will be noted that the edges of the teeth 46 are forwardly inclined relative to the crests thereof in any position of the handle in which the keels are operative so that the sled cannot become snagged if the teeth 46 engage a root or rock on which a perpendicular tooth edge might catch.

It will be appreciated that the weight of the handles is such that they, if dropped or when resting on the surface of the snow or ice, force the teeth into holding engagement therewith to ensure that the sled cannot, even on an incline, accidentally start. In this connection, it is preferred that a check strap 47 be provided which is connected to the sled body 20 as at 48, see FIGURE 3, and detachably connected to the hook 49 on the handle cross brace thereby to prevent the handles 35 from accidentally swinging into their rearward, pushing position. A chain 50 is shown as connected to the handles 35 and of sufficient length to be caught on the hook 49 when not in use and to drag in the snow under the sled body 20, if released therefrom, thus to provide braking action.

It is preferred, however, to have the principal braking section provided by brakes 51, one on each plate 43 and extending outwardly therefrom. The forward face of each brake 51 is outwardly and inwardly flared and the lower part 52A of its outer edge 52 tapers downwardly and inwardly so that the braking action may be varied by swinging the handles in a vertical direction, downwardly to increase the braking effect, upwardly to decrease it, thereby enabling the guiding skier to easily control the braking effect and also the effect of the keels.

As the movement of an injured person often presents a problem, a stretcher, generally indicated at 53 is provided. The stretcher 53 is shaped to fit within the sled body 20 and with its forward end preferably supported by an insert 54 seated therein. The stretcher 53 may be of plywood and is marginally reinforced by lengthwise ribs 55 to which loops 56 are secured and these extend upwardly through holes 57 in the stretcher 53. The stretcher has a plurality of holes 58 through which a cord 59 is threaded to provide a plurality of loops to which the injured person may be secured by attaching straps or the ends of bandages thereto or which may received splinting or supporting members. The looped cord is shown as providing a pair of transversely spaced loops 59A for securing a person's head, a pair of transversely alined pair of loops 59B for securing his shoulders, two pair of transversely spaced loops 59C and 59D for securing his torso to the stretcher, two sets of three transversely spaced loops 59E and 59F for securing the thigh of the patient, and two sets of three more closely spaced loops 59G and 59H with transversely alined loops 59J for traction purposes at the end of the loops 59H. A supporting pillow 60 of U-shaped section may be used or a head rest consisting of sections 61 and 62 disposed approximately at right angles to each other may be used. They may, as shown in FIGURE 12, be connected to the loops 59A and in which the head rest may be used for traction.

In the embodiment shown in FIGURES 8–10, a sled 63 of the toboggan type is shown as having an upwardly curved forward end 64, lengthwise runners 65, and, preferably, the sled 63 has a fibreglass coat. Marginally of a mattress 66 there are a series of slotted anchors 67 for ropes and adjacent the forward end 64 there are a pair of mounts 68 through which a pivot 69 extends with handles 35A rotatably secured thereto, the handles being identical to those described in connection with the embodiment illustrated by FIGURES 1–5 and including the same keel and brake features for which like reference numerals are used but distinguished by the suffix addition A. Secured to the upper surface of the sled 63 are a pair of wedges 70 and 71 spaced apart to receive the pivot 69 between them and make its presence under the mattress less noticeable.

In the embodiment of the invention illustrated by FIGURES 13–15, the sled 72 is toboggan-like and has, along each side, a length of rope 73 anchored at a plurality of zones 74 to provide a series of loops 75 for use in securing a load or an injured person. A saddle 76 extends under the forward part of a mattress 77 and is held in place as by screws 78. The saddle 76 has upturned end walls 79 to each of which a handle 35B is secured by a pivot 80. The handles 35B are identical to the handles of the other embodiments of the invention that have been described and include the same brake and keel features with like parts having the same reference numerals but distinguished by the suffix addition B.

From the foregoing, it will be appreciated that sleds in accordance with the invention are well adapted to meet a wide range of requirements of use by skiers in mountainous terrain due to the provision of brake, keels, or both operated by swinging the handles in the appropriate vertical direction and to the appropriate extent thus affording endwise sled control in either direction, sidewise sled control, or both. In addition, the "fail safe" feature coupled with the low centers of gravity of the various sled bodies contributes to the assurance that transportation combines safety with speed considerations. The effectiveness of the sled is assured on a wide variety of surfaces for on ice, the teeth and the lower or inwardly and downwardly tapering part of the brake enables adequate sled control to be maintained. On packed snow, the teeth of the keel plates and an increased part of the brake are available for control of the sled, while in light snow, the entire surface of each brake is available and, if necessary, the chain or other flexible member under the sled can be used for additional braking effect.

I claim:

1. A sled for use in carrying an injured skier or other load, said sled including an elongated, disk-shaped body to receive the skier and slidable on the ice and snow, a pair of handles, one for each side of said body, a saddle extending transversely of said body and including downturned ends, each overlying a side thereof, a brace for each end connected to said body above the bottom thereof, and transversely alined pivot means interconnecting each handle to said body and extending through the appropriate saddle end and the brace therefor, each handle including a keel and brake means for engagement with the ice and snow by swinging the handles in the appropriate vertical direction and to an appropriate extent.

2. The sled of claim 1 in which each pivot means includes a hollow, internally threaded bolt extending through a saddle end and the brace therefor, a nut threaded thereon, and a pivot threaded into each bolt and rotatably supporting a handle.

3. A vehicle for use in carrying an injured skier or other load, said vehicle comprising an elongated body to receive the load and including portions slidable on ice and snow covered surfaces, rigid handle structure extending forwardly of said body and including at its rear end transverse pivot means connecting it to said body, and brake means connected to said structure forwardly of said pivot means and engageable with such a surface when the structure is swung downwardly from an elevated position in which the brake means is inoperative.

4. The vehicle of claim 3 in which the brake means comprises a transversely disposed member.

5. The vehicle of claim 3 in which the brake means are a pair of outwardly and rearwardly inclined wings.

6. The vehicle of claim 3 in which the brake means is in the form of a vertically disposed keel.

7. The vehicle of claim 3 in which the weight of the handle structure is operative, when in a forwardly extending position, to maintain said brake means operatively engaged.

8. The vehicle of claim 3 in which a check strap interconnects the front end of the body and the handle structures.

9. A vehicle for use in carrying an injured skier or other load, said vehicle comprising an elongated body to receive the load and including portions slidable on ice and snow covered surfaces, rigid handle structure extending forwardly of said body and including at its rear end transverse pivot means connecting it to said body, and brake means connected to said structure forwardly of said pivot means and engageable with such a surface when the structure is swung downwardly from an elevated position in which the brake means is inoperative, the brake means being so disposed that, on such engagement, a downward turning movement of said structure results.

10. A vehicle for use in carrying an injured skier or other load, said vehicle including an elongated body to receive the load and including portions slidable on ice and snow, an actuating member transversely pivoted at one end to said body above said portions, the other end of said member extending forwardly of its pivot axis, and brake means forwardly of but adjacent the pivot axis of said member and connected thereto for engagement with such a supporting surface when the member is swung downwardly from an elevated position in which said brake means is inoperative.

11. A vehicle for use in carrying an injured skier or other load, said vehicle comprising an elongated body to receive the load and including portions slidable on ice and snow covered surfaces, a pair of handles, and pivot means connecting each arm to a respective one of the sides of said body above said portions, the other ends of said handles extending forwardly beyond said front end, the pivot axes of said handles being transversely alined, each handle including braking means forwardly of but adjacent to said axes and including a depending brake portion engageable with such a supporting surface when the handles are swung downwardly from a position in which said brake portions are inoperative.

12. The vehicle of claim 11 in which each of the braking means also includes an outwardly projecting brake portion located close to but forwardly of the pivot axis.

13. The vehicle of claim 11 in which each of the braking means is in the form of a keel rigidly secured to the appropriate one of the handles, the leading edge of each keel being rearwardly and downwardly inclined in any surface engaging position thereof.

14. The vehicle of claim 11 in which each of the braking means is in the form of a keel rigidly secured to the appropriate one of said handles and each keel includes an outwardly projecting braking wing.

15. The vehicle of claim 11 in which the handles are rigidly connected between the ends thereof and open between their free ends.

16. The vehicle of claim 11 in which the pivot means enable the handles to be swung rearwardly and the handles are rigidly connected between the ends thereof, and are of such a length that the free ends thereof are then rearwardly of the rear end of the vehicle.

References Cited by the Examiner

UNITED STATES PATENTS

| | | | |
|---|---|---|---|
| 2,365,174 | 12/1944 | Cochran | 280—18 |
| 2,503,314 | 4/1950 | Atwood | 5—82 |
| 2,517,443 | 8/1950 | Rhodes et al. | 5—82 |
| 2,829,902 | 4/1958 | Stocker | 280—18 |
| 3,104,116 | 9/1963 | Knight | 280—18 |

FOREIGN PATENTS

| | | |
|---|---|---|
| 36,597 | 1/1923 | Norway. |
| 1,013,302 | 4/1952 | France. |

ARTHUR L. LA POINT, *Primary Examiner.*